(12) United States Patent
Fischer et al.

(10) Patent No.: US 8,172,260 B2
(45) Date of Patent: May 8, 2012

(54) BI-LOBULAR AIR BAG

(75) Inventors: Kurt F. Fischer, Leonard, MI (US);
Douglas M. Gould, Lake Orion, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 414 days.

(21) Appl. No.: 12/493,270

(22) Filed: Jun. 29, 2009

(65) Prior Publication Data

US 2010/0007124 A1  Jan. 14, 2010

Related U.S. Application Data

(60) Provisional application No. 61/134,884, filed on Jul. 14, 2008.

(51) Int. Cl.
*B60R 21/233* (2006.01)
*B60R 21/239* (2006.01)
*B60R 21/231* (2006.01)

(52) U.S. Cl. ............... 280/729; 280/730.1; 280/743.1; 280/739

(58) Field of Classification Search .............. 280/729, 280/730.1, 732, 739, 743.1, 743.2
See application file for complete search history.

(56) References Cited

U.S. PATENT DOCUMENTS

| | | | |
|---|---|---|---|
| 7,445,237 B2 * | 11/2008 | Boyle et al. | 280/739 |
| 7,614,655 B2 * | 11/2009 | Hasebe | 280/743.1 |
| 7,954,850 B2 * | 6/2011 | Fischer et al. | 280/743.1 |
| 7,980,592 B2 * | 7/2011 | Fischer et al. | 280/743.1 |
| 2004/0155439 A1 * | 8/2004 | Hasebe et al. | 280/729 |
| 2006/0186647 A1 | 8/2006 | Bosch | |
| 2006/0279072 A1 | 12/2006 | Hanawa et al. | |
| 2007/0018438 A1 * | 1/2007 | Hasebe et al. | 280/729 |
| 2007/0108753 A1 | 5/2007 | Pang et al. | |
| 2007/0200319 A1 | 8/2007 | Idomoto et al. | |
| 2007/0262572 A1 * | 11/2007 | Fischer et al. | 280/730.1 |
| 2008/0007036 A1 * | 1/2008 | Furuno et al. | 280/743.1 |
| 2008/0054613 A1 | 3/2008 | Narimoto et al. | |
| 2008/0073882 A1 | 3/2008 | Hasebe et al. | |

* cited by examiner

*Primary Examiner* — Paul N. Dickson
*Assistant Examiner* — George D. Spisich
(74) *Attorney, Agent, or Firm* — Tarolli, Sundheim, Covell & Tummino LLP

(57) ABSTRACT

An inflatable vehicle occupant protection device (14) includes a vertically extending central recess (200) and first and second lobes (202 and 204) positioned on opposite sides of the central recess. The central recess (200) and the first and second lobes (202 and 204) are defined at least partially by an elongated center panel (210) of the protection device (14). The center panel (210) includes first and second longitudinal edges (250 and 252) that are spaced apart from each other and that extend along the length of opposite edge portions of the center panel. The center panel (210) also includes first and second end portions (260 and 280) that are spaced apart and that are positioned opposite each other along the length of the center panel. The center panel (210) is arranged in a loop, and a portion (270) of the first longitudinal edge (252) along the first end portion (260) is interconnected with a portion (290) of the second longitudinal edge (250) along the second end portion (280) of the panel to form a vertically extending seam (220) that helps define the central recess.

16 Claims, 14 Drawing Sheets

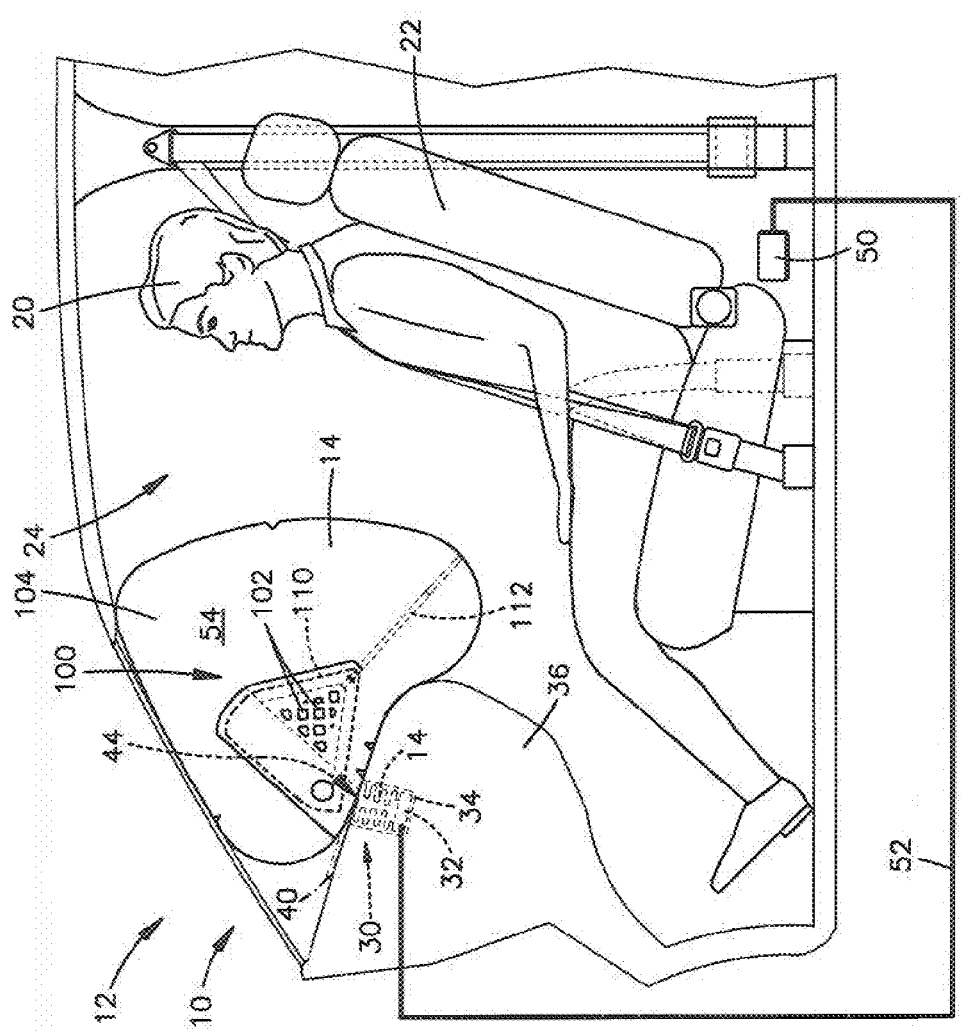

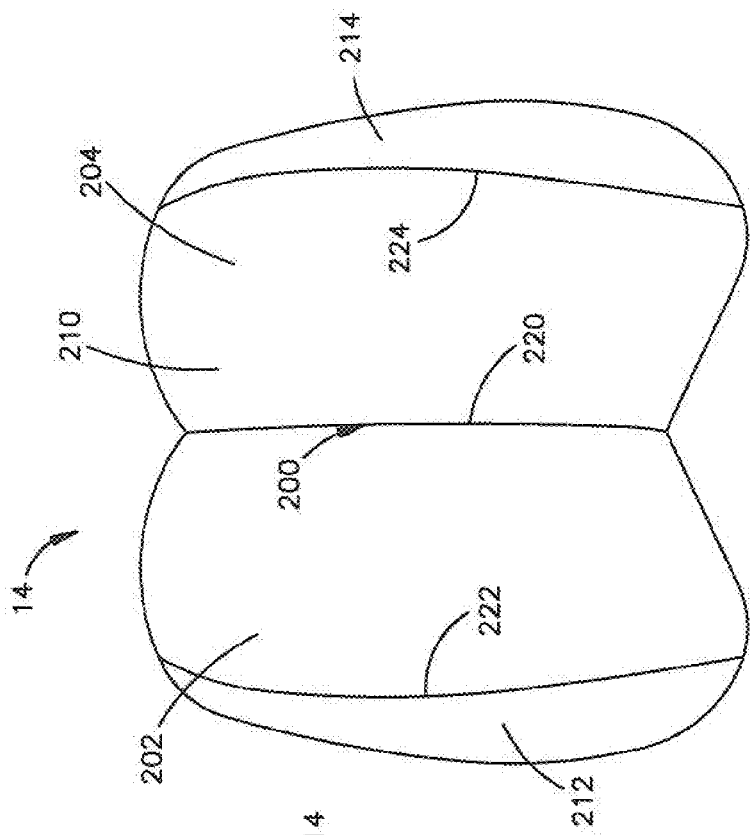
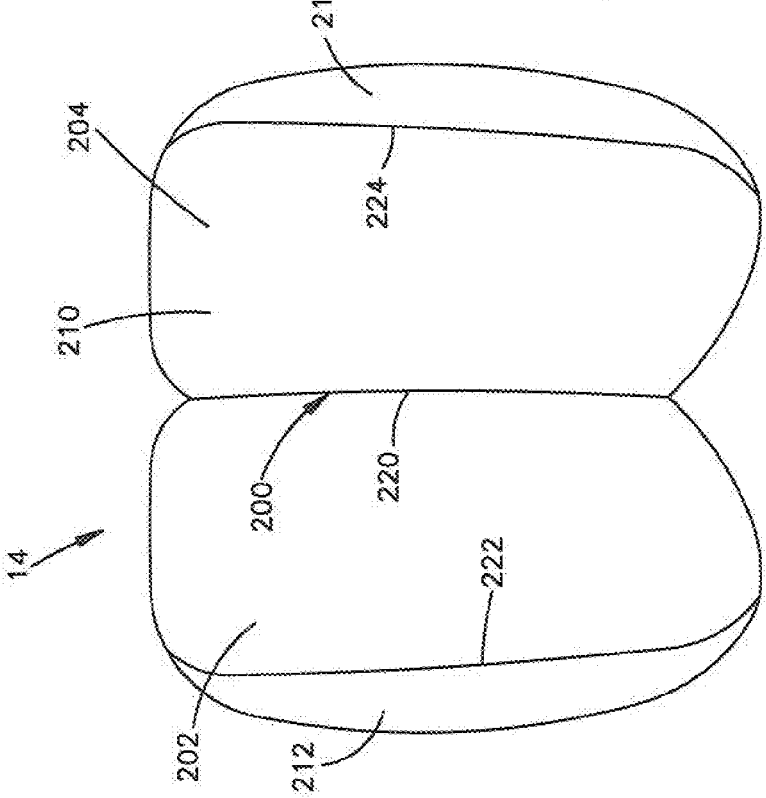

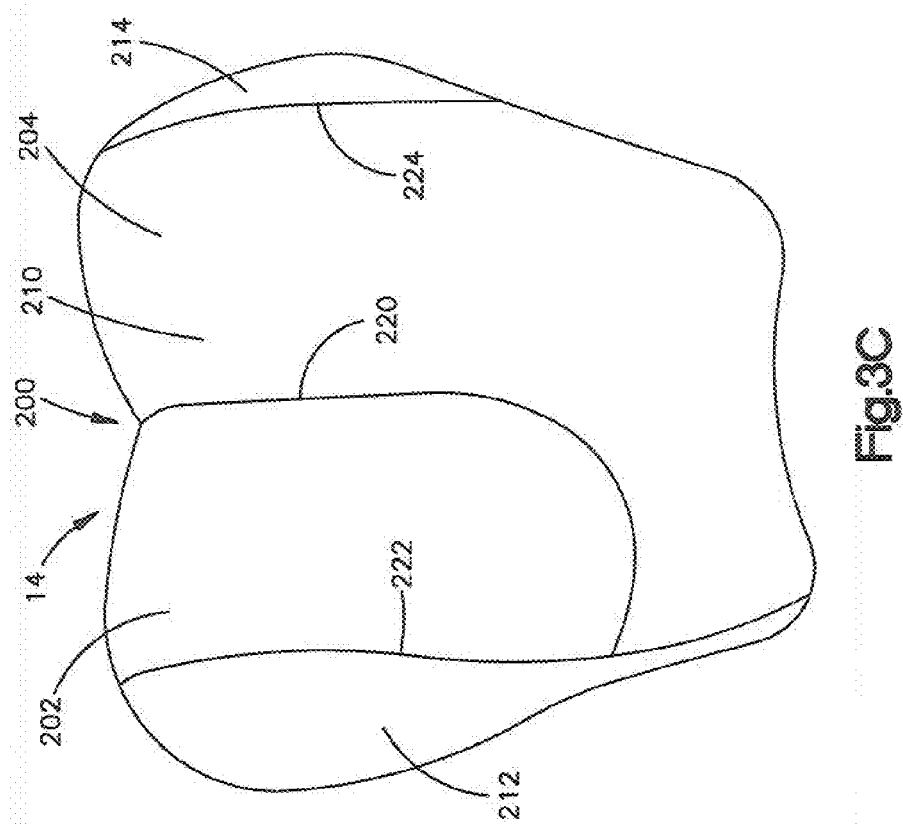
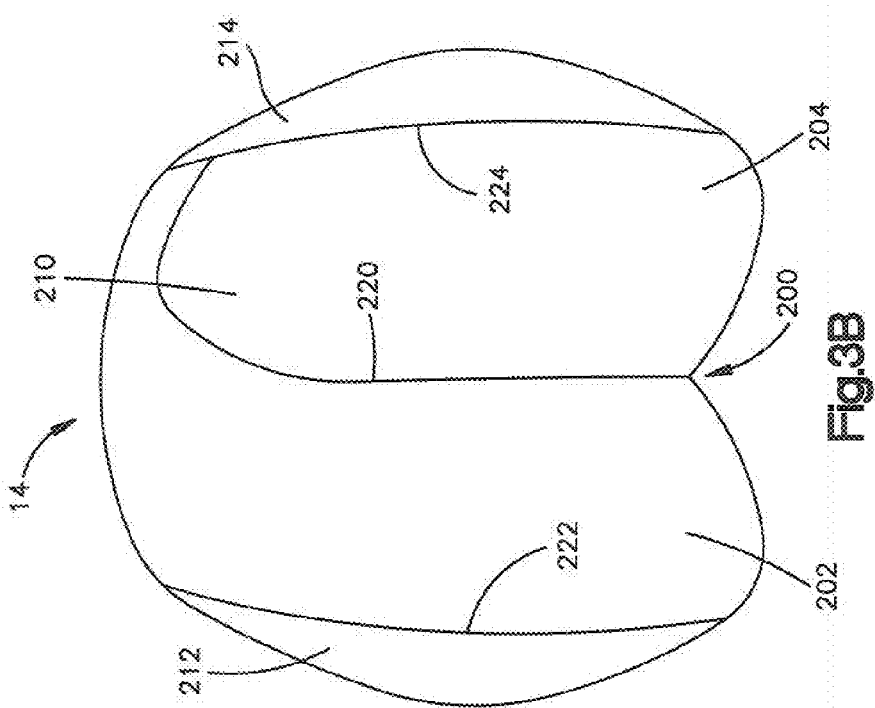

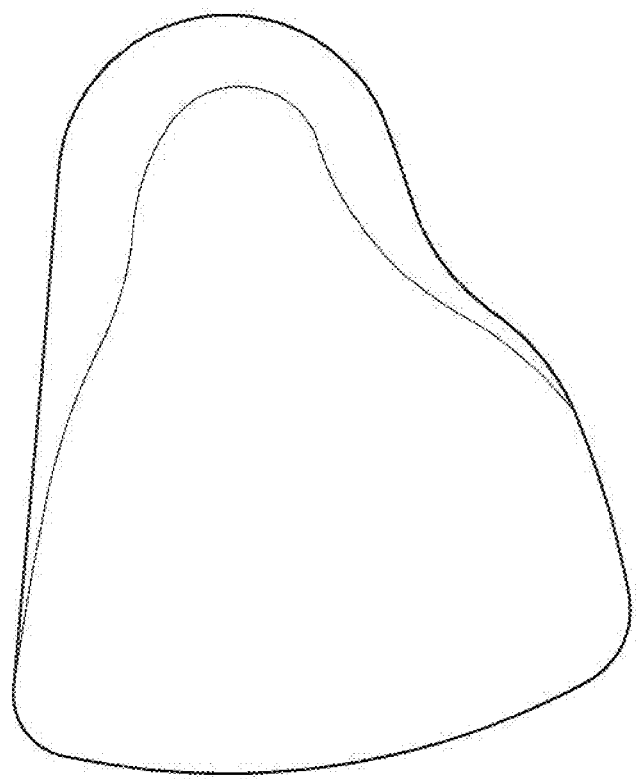
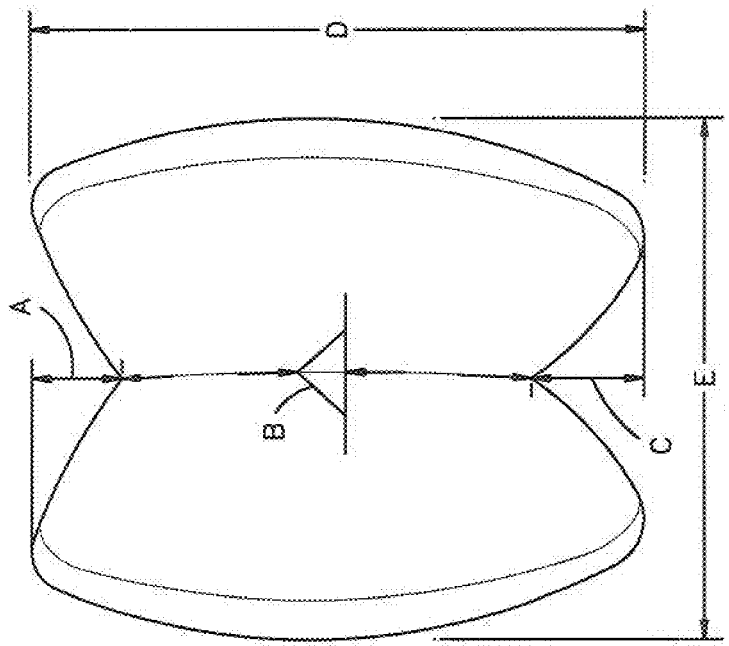
Fig.8B
Fig.8A

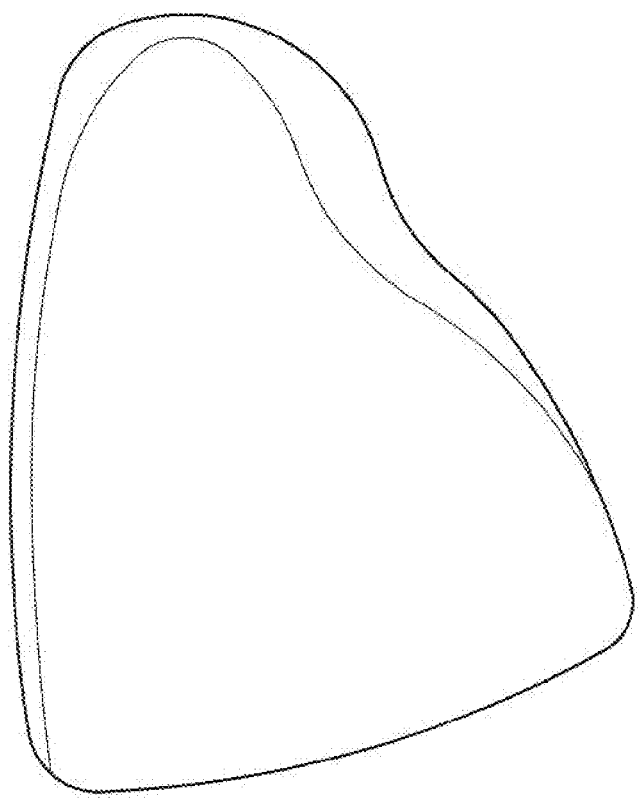
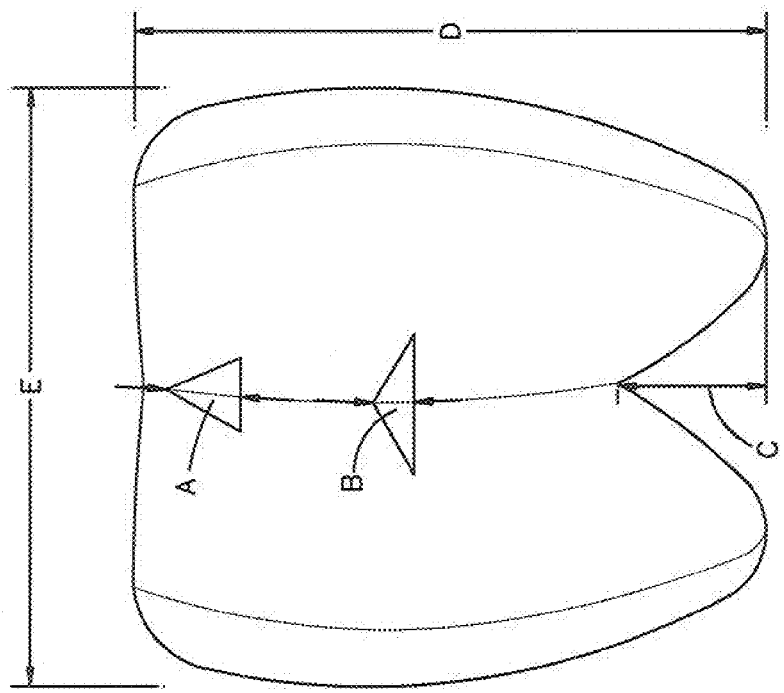
Fig.9B
Fig.9A

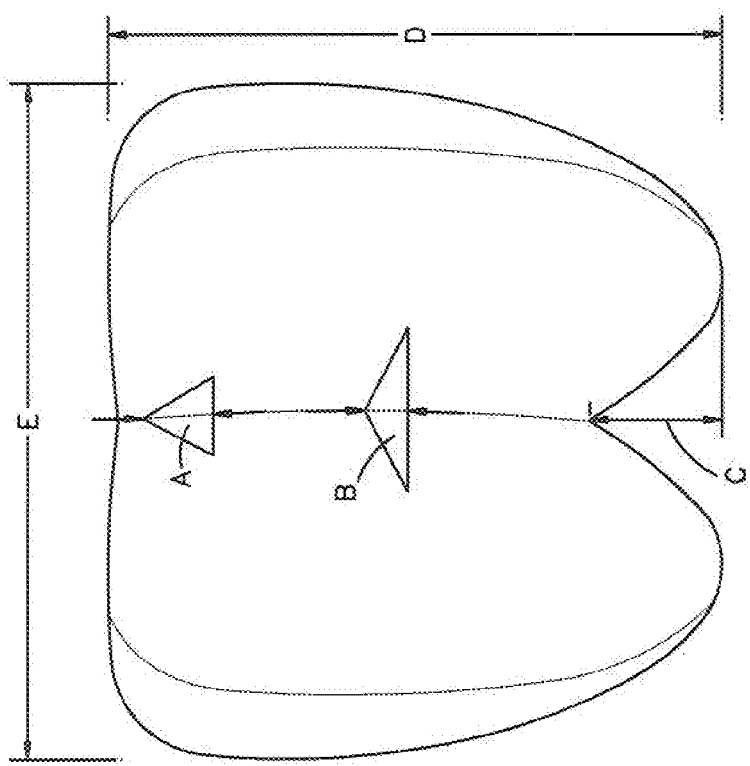

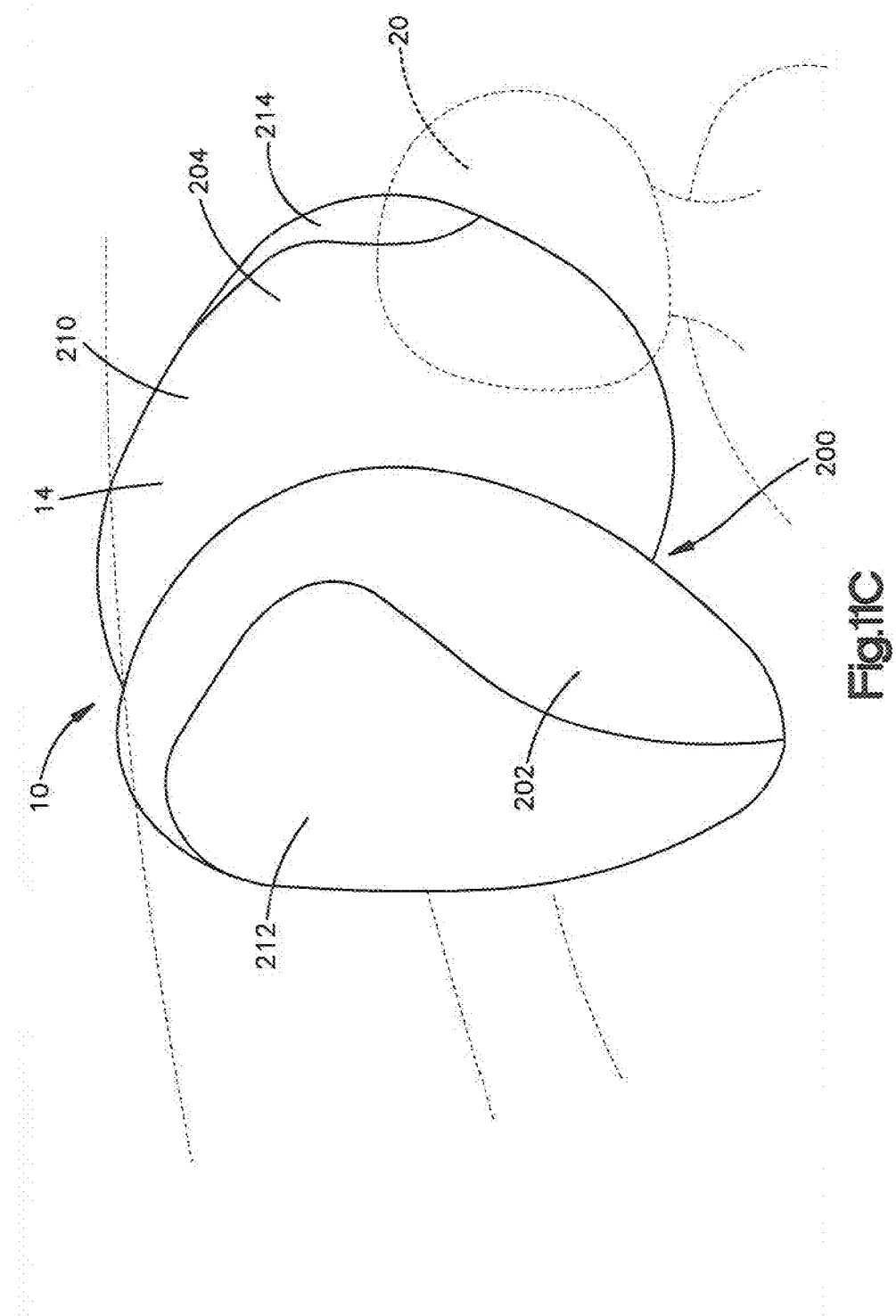

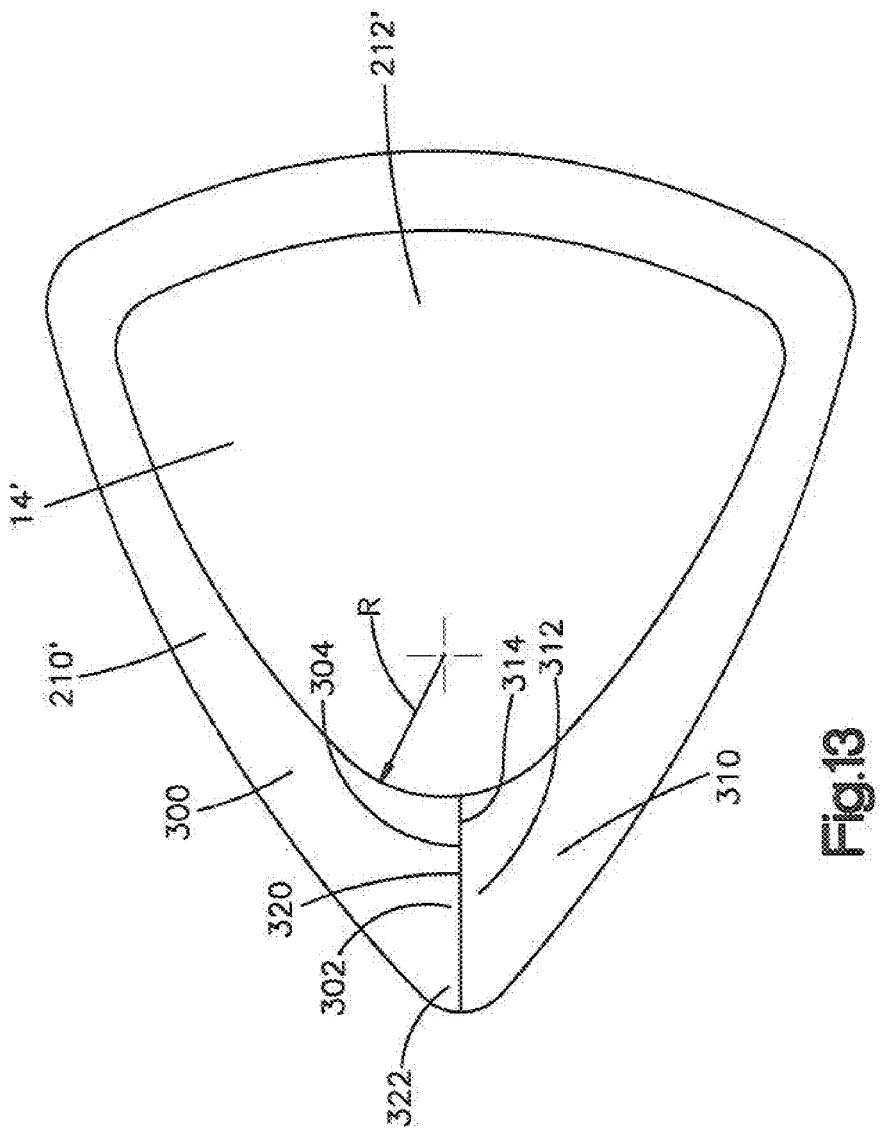

BI-LOBULAR AIR BAG

RELATED APPLICATIONS

This application claims the benefit of U.S. Provisional Application Ser. No. 61/134,884, filed on Jul. 14, 2008.

FIELD OF THE INVENTION

The present invention relates to an apparatus for helping to protect an occupant of a vehicle. More particularly, the present invention relates to an air bag inflatable between an instrument panel and a front seat occupant of a vehicle.

BACKGROUND OF THE INVENTION

It is known to provide an inflatable vehicle occupant protection device, such as an air bag, for helping to protect an occupant of a vehicle. One particular type of air bag is a frontal air bag inflatable between an occupant of a front seat of the vehicle and an instrument panel of the vehicle. Such air bags may be driver air bags or passenger air bags. When inflated, the driver and passenger air bags help protect the occupant from impacts with parts of the vehicle such as the instrument panel and/or a steering wheel of the vehicle.

Passenger air bags are typically stored in a deflated condition in a housing that is mounted to the vehicle instrument panel. An air bag door is connectable with the housing and/or instrument panel to help enclose and conceal the air bag in a stored condition. Upon deployment of the passenger air bag, the air bag door opens to permit the air bag to move to an inflated position. The air bag door opens as a result of forces exerted on the door by the inflating air bag.

Driver air bags are typically stored in a deflated condition in a housing that is mounted on the vehicle steering wheel. An air bag cover is connectable with the housing and/or steering wheel to help enclose and conceal the air bag in a stored condition. Upon deployment of the driver air bag, the air bag cover opens to permit the air bag to move to an inflated position. The air bag cover opens as a result of forces exerted on the cover by the inflating driver air bag.

SUMMARY OF THE INVENTION

The present invention relates to an apparatus for helping to protect an occupant of a vehicle. The apparatus includes an inflatable vehicle occupant protection device having a deflated condition and an inflated condition.

The air bag has a bi-lobular design in which first and second lobes are defined by a recess positioned between the lobes. The air bag has a construction in which the lobes are defined by a single piece of material that is cut in a pattern and has portions interconnected to create the lobes.

The present invention also relates to an inflatable vehicle occupant protection device for being inflated between an occupant of the vehicle and an instrument panel of the vehicle. The protection device includes a vertically extending central recess and first and second lobes positioned on opposite sides of the central recess. The central recess and the first and second lobes are defined at least partially by an elongated center panel of the protection device. The center panel includes first and second longitudinal edges that are spaced apart from each other and that extend along the length of opposite edge portions of the center panel. The center panel also includes first and second end portions that are spaced apart and that are positioned opposite each other along the length of the center panel. The center panel is arranged in a loop, and a portion of the first longitudinal edge along the first end portion is interconnected with a portion of the second longitudinal edge along the second end portion of the panel to form a vertically extending seam that helps define the central recess.

The present invention further relates to an inflatable vehicle occupant protection device including a vertically extending central recess and first and second lobes positioned on opposite sides of the central recess. The protection device includes an elongated center panel that has a generally S-shaped configuration with a first curved end portion curved outwardly in a first direction with respect to a length of the center panel. A second curved end portion, opposite the first curved end portion, is curved outwardly in a second direction, opposite the first direction, with respect to a length of the center panel. The center panel is arranged in a loop, and a first inner curved edge of the first curved end portion is connected with a second inner curved edge of the second curved end portion, the connection between the first and second inner curved edges defining the central recess.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic side view illustrating an apparatus for helping to protect an occupant of a vehicle including a bi-lobular air bag, according to a first embodiment of the present invention;

FIG. 2 is a front view of an embodiment of a bi-lobular air bag in accordance with the present invention in an inflated condition;

FIGS. 3A-3C are views illustrating an embodiment of a bi-lobular air bag in accordance with the present invention in an inflated condition;

FIGS. 8A and 8B are front and side views, respectively, of an embodiment of a bi-lobular air bag in accordance with the present invention in an inflated condition and illustrating certain dimensions;

FIGS. 9A and 9B are front and side views, respectively, of another embodiment of a bi-lobular air bag in accordance with the present invention in an inflated condition and illustrating certain dimensions;

FIGS. 10A and 10B are front and side views, respectively, of a further embodiment of a bi-lobular air bag in accordance with the present invention in an inflated condition and illustrating certain dimensions;

FIGS. 11A-11C illustrate an embodiment of a bi-lobular air bag in accordance with the present invention in an inflated condition in a vehicle;

FIG. 13 is a side view illustrating an air bag constructed from the parts illustrated in FIG. 12.

DETAILED DESCRIPTION OF THE INVENTION

Figure 4A:
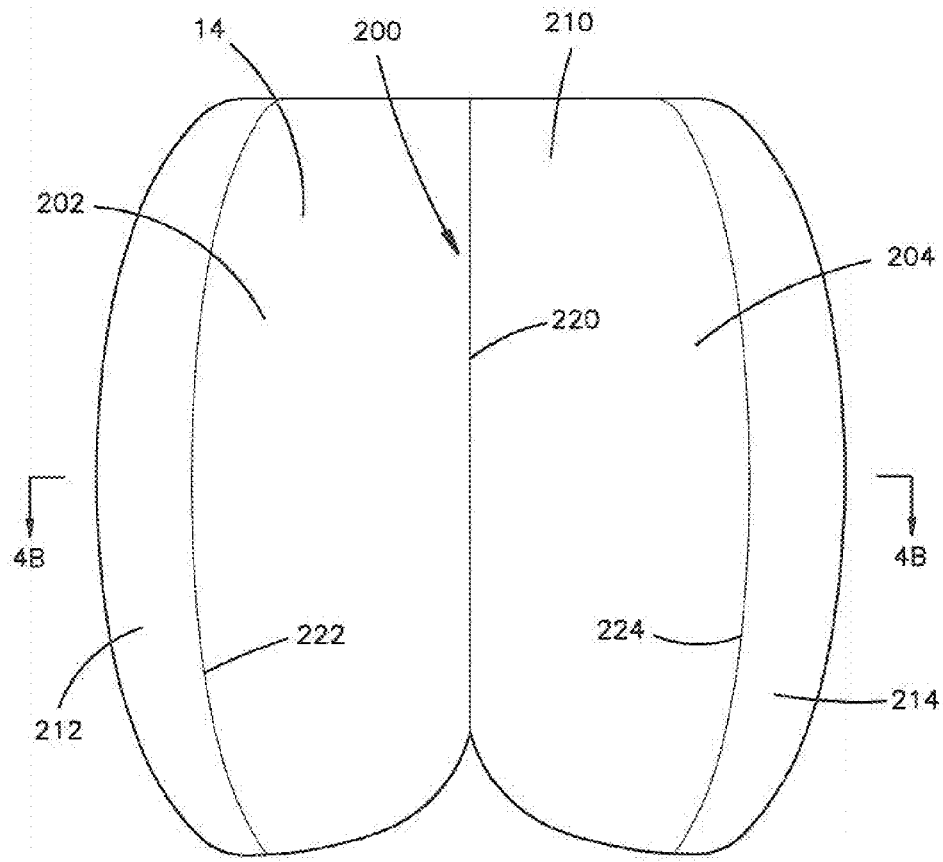
FIG. 4A is a schematic view illustrating a front view of a bi-lobular air bag in accordance with the present invention.

An apparatus 10 for helping to protect an occupant 20 of a vehicle 12 includes an inflatable vehicle occupant protection device 14 in the form of an air bag. In the embodiment illustrated in FIG. 1, the air bag 14 is a passenger frontal air bag for helping to protect an occupant 20 of a seat 22 on a passenger side 24 of the vehicle 12. Those skilled in the art will appreciate that the apparatus 10 disclosed herein could be adapted for a driver side vehicle occupant (not shown) or occupants of rearward rows of the vehicle 12, such as a $2^{nd}$ row, $3^{rd}$ row, etc., of the vehicle (not shown).

The air bag 14 may be part of an air bag module 30 that includes an inflator 32 and a housing 34. The air bag 14 has a stored condition, indicated by dashed lines in FIG. 1, in which the air bag is folded and placed in the housing 34. The module 30 is mounted to a dash or instrument panel 36 of the vehicle 12. The housing 34 helps contain and support the air bag 14 and inflator 32 in the instrument panel 36.

An air bag door 40 is releasably connected to the instrument panel 36 and/or the housing 34. In a closed condition (not shown), the air bag door 40 forms a cover for the module 30 and helps enclose the air bag 14 in the stored condition in the housing 34. The door 40 is movable to an opened condition illustrated in FIG. 1 to uncover an opening 44 through which the air bag 14 may be deployed from the stored condition in the housing 34. The door 40 may be connected to the vehicle 12, e.g., the instrument panel 36, either directly or through the housing 34, by means (not shown), such as a plastic hinge portion, a strap, or a tether.

The inflator 32 is actuatable to provide inflation fluid to an inflatable volume 54 of the air bag 14 to deploy the air bag to the inflated condition. The inflator 32 may be of any known type, such as stored gas, solid propellant, augmented, or hybrid. The apparatus 10 includes a sensor, illustrated schematically at 50, for sensing an event for which inflation of the air bag 14 is desired, such as a collision. The inflator 32 is operatively connected to the sensor 50 via lead wires 52.

The air bag 14 can be constructed of any suitable material, such as nylon (e.g., woven nylon 6-6 yarns), and may be constructed in any suitable manner. For example, the air bag 14 may include one or more pieces or panels of material. If more than one piece or panel is used, the pieces or panels may be interconnected by known means, such as stitching, ultrasonic welding, heat bonding, or adhesives, to form the air bag. The air bag 14 may be uncoated, coated with a material, such as a gas impermeable urethane, or laminated with a material, such as a gas impermeable film. The air bag 14 thus may have a gas-tight or substantially gas-tight construction. Those skilled in the art will appreciate that alternative materials, such as polyester yarn, and alternatives coatings, such as silicone, may also be used to construct the air bag 14.

The air bag 14 may have one or more actuatable features for helping to control or tailor inflation of the air bag in response to vehicle conditions, occupant conditions, or both. These features may be actuatable actively, for example, in response to conditions determined via active sensors, or passively, for example, having a configuration responsive to physical conditions at the time of inflation.

In the embodiment of FIG. 1, the air bag 14 includes a vent 100 that is selectively actuatable to release inflation fluid from the inflatable volume 54 of the air bag 14. The vent 100 may have various configurations. In the embodiment illustrated in FIG. 1, the vent 100 includes one or more vent openings 102 formed in a side panel 104 of the air bag 14, a vent door 110 secured to the side panel, and a flexible elongated member 112, such as a tether, secured to the door panel.

The vent door 110 is secured to the side panel 104 by known means (not shown), such as stitching, ultrasonic welding, heat bonding, or adhesives. The vent 100 has an open condition in which the vent door 110 is positioned away from the vent openings 102 and thereby permits inflation fluid to vent, i.e., flow, through the vent openings. In the open condition, the vent door 110 is folded away from the vent openings 102 and held in place by a releasable tear stitch. The tether 112 has a first end portion secured to the vent door 110 and an opposite second end portion secured to the air bag 14.

Upon sensing the occurrence of an event for which inflation of the air bag 14 is desired, such as a vehicle collision, the sensor 50 provides a signal to the inflator 32 via the lead wires 52. Upon receiving the signal from the sensor 50, the inflator 32 is actuated and provides inflation fluid to the inflatable volume 54 of the air bag 14 in a known manner. The inflating air bag 14 exerts a force on the door 40, which moves the door to the opened condition. The air bag 14 inflates from the stored condition to a deployed condition, such as the fully inflated and deployed condition illustrated in solid lines in FIG. 1. The air bag 14, while inflated, helps protect the vehicle occupant 20 from impacts with parts of the vehicle 12, such as the instrument panel 36.

When an event occurs which inflation of the air bag 14 is desired, the vent 100 responds to vehicle conditions, occupant conditions, or both to help control inflation and deployment of the air bag. For example, the air bag 14 may be constructed such that the vent 100 is actuated in response to unobstructed deployment of the air bag 14 when the occupant is in a normally seated position. In this configuration, the air bag 14 may also be constructed to block actuation of the vent 100 in response to the obstructed deployment of the air bag 14 when, for example, the occupant is away from the normally seated position.

Referring to FIG. 2, The air bag 14 includes a center panel 210, a first side panel 212 that forms a left side of the air bag, and a second side panel 214 that forms a right side of the air bag. The panels 210, 212, and 214 are interconnected by means, such as stitching, to define the structure of the air bag 14. In the embodiment of FIG. 2, central stitching 220 interconnects portions of the center panel 210 to define the recess 200. First side stitching 222 connects the first side panel 212 to the center panel 210. Second side stitching 224 connects the second side panel 214 to the center panel 210. The air bag 14 includes a central recess 200, a first lobe 202 positioned to the left of the recess as viewed in FIG. 2, and a second lobe 204 positioned to the right of the recess as viewed in FIG. 3.

Figure 4B:
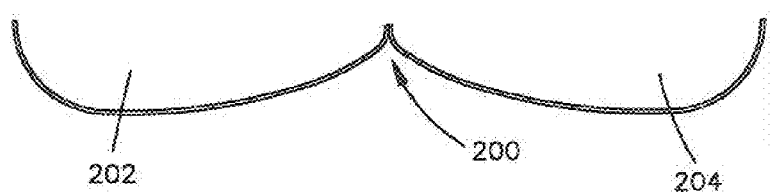
FIG. 4B is a sectional view bag taken generally along line 4B-4B in FIG. 4A.

FIGS. 3A-3C illustrate front, top, and bottom views, respectively, of the air bag 14 in an inflated condition. FIG. 4A illustrates the air bag 14 schematically with a sectional view taken generally along line 4B-4B illustrated in FIG. 4B. As can be seen in these figures, the stitching 220 interconnecting portions of the center panel 210 to help define the recess 200, first lobe 202, and second lobe 204 has a generally curved and S-shaped configuration as viewed vertically from top to bottom in FIGS. 3A-3C.

Figure 5:
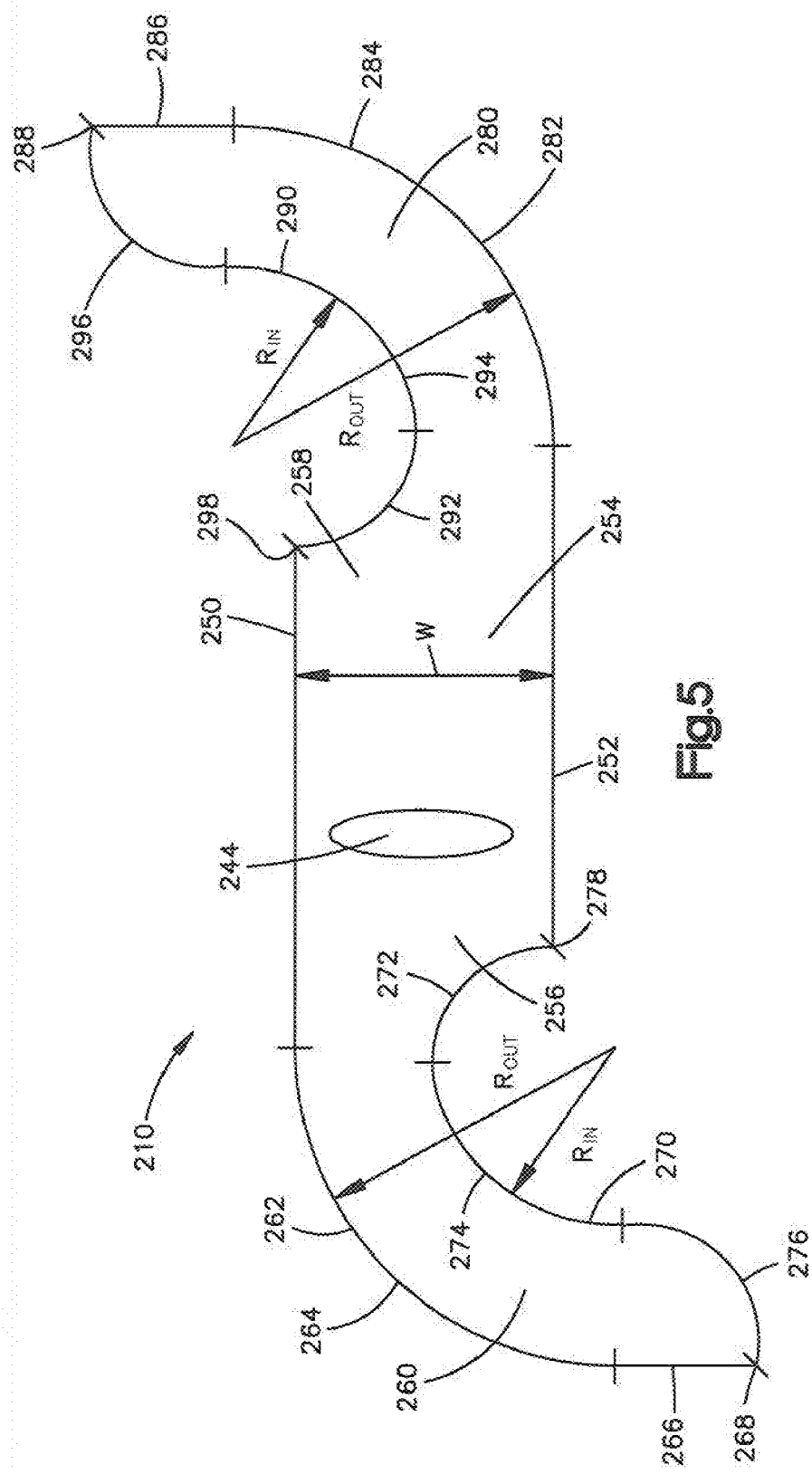
FIG. 5 is a plan view illustrating a center panel of a bi-lobular air bag in accordance with the present invention.
Figure 6:
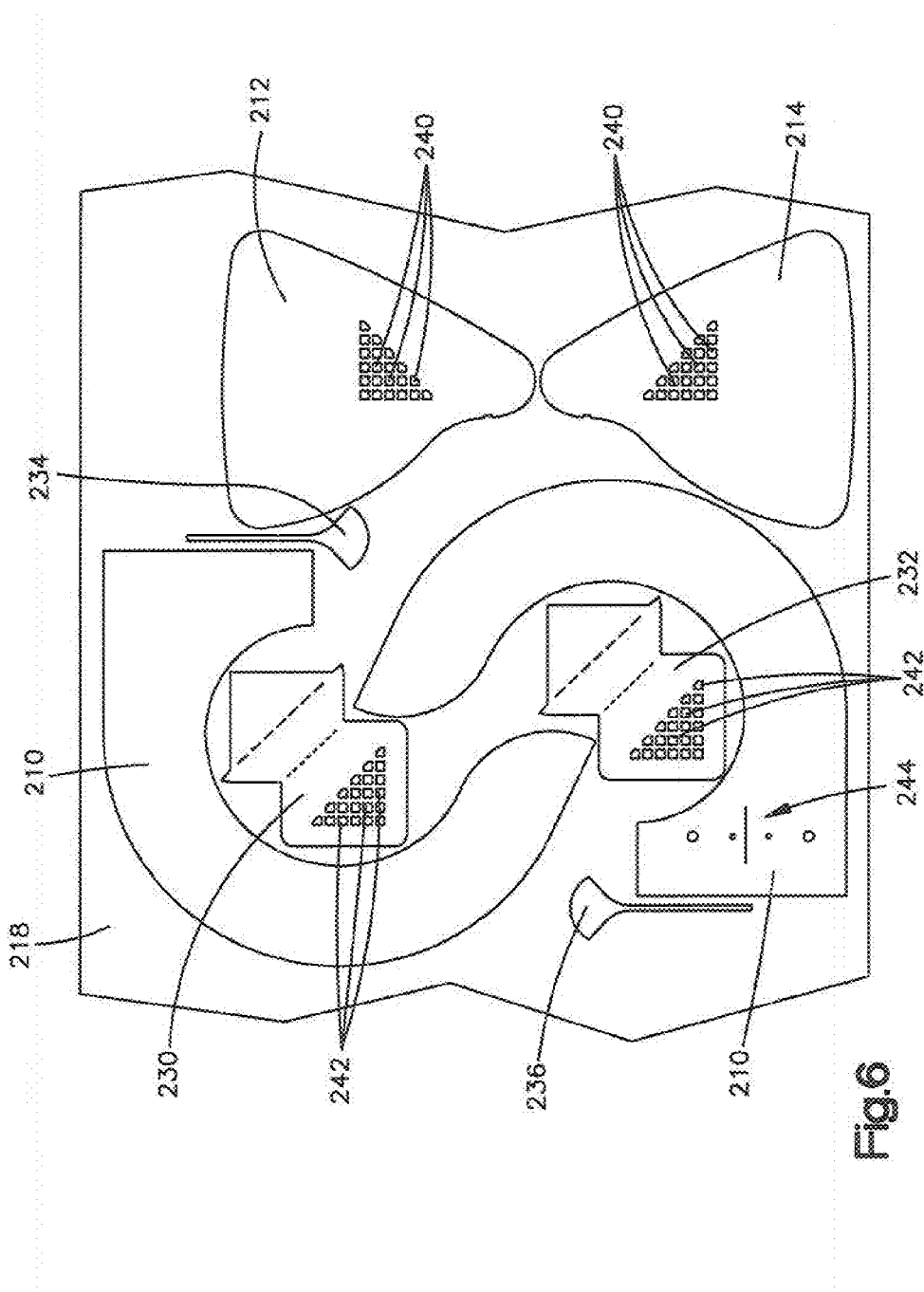
FIG. 6 is a plan view illustrating portions of a bi-lobular air bag laid out on a sheet for cutting into individual parts in accordance with the present invention.

FIGS. 5 and 6 illustrate schematically components used to construct an air bag 14 in accordance with one embodiment of the present invention. As shown in FIG. 5, the center panel 210 may have a one piece construction. As shown in FIG. 6, the center panel 210 may have a two piece construction. FIG. 6 illustrates how components used to construct the air bag 14 may be cut from a single piece or sheet 218 of material. As shown in FIG. 6, the two piece design of the center panel may help provide better nesting and thereby help reduce material costs.

As shown in FIG. 6, the components may include the center panel 210, side panels 212 and 214, first and second vent door panels 230 and 232, respectively, and first and second vent tethers 234 and 236, respectively. The side panels 212 and 214 include vent openings 240 that correspond with openings 242 in the vent door panels 230 and 232. The center panel 210 may have various openings 244 for accommodating connection with the air bag module and the inflator.

Referring to FIG. 5, the center panel 210 includes first and second edge portions 250 and 252, respectively, that extend parallel to each other and help define the portions of the center panel connected to the first and second side panels 212 and 214. The edge portions 250 and 252 define a central portion 254 of the center panel 210. The central portion 254 has a generally rectangular configuration.

First and second end portions 260 and 280, respectively, extend from opposite ends of the central portion 254 of the center panel 210. The first and second end portions 260 and 280 have generally curved configurations and, as shown in FIG. 5, may have dimensions that are identical to each other. The first end portion 260 curves generally downward and to the left from a first end 256 of the central portion 254. The second end portion 280 curves generally downward and to the right from a second end 258 of the central portion 254. The first and second end portions 260 and 280 have widths about equal to one-half the width, indicated generally at W in FIG. 5, of the central portion 254.

The first end portion 260 has an outer edge 262 that extends from the first edge portion 250 of the center panel 210 and an inner edge 270 that extends from the second edge portion 252 of the center panel. The outer and inner edges 262 and 270 have portions delineated by hash marks in FIG. 5. The outer edge 262 includes a curved portion 264 that curves generally downward and to the left as viewed in FIG. 5 and a straight terminal second portion 266 that extends generally vertically as viewed in FIG. 5.

The inner edge 270 includes a first portion 272 that extends generally upward and to the left from an intersection point 278 with the second edge portion 252. A second curved portion 274 extends from the first curved portion 272 downward and to the left. A third curved portion 276 extends from the second curved portion 274 downward and to the left along a curvature opposite or reversed from the first and second curved portions 272 and 274. The third curved portion 276 terminates in an intersection with the second portion 266 of the outer edge 260 at a terminal end point 268.

The second end portion 280 has an outer edge 282 that extends from the second edge portion 252 of the center panel 210 and an inner edge 290 that extends from the first edge portion 250 of the center panel. The outer and inner edges 282 and 290 have portions delineated by hash marks in FIG. 5. The outer edge 282 includes a curved portion 284 that curves generally upward and to the right as viewed in FIG. 5 and a straight terminal second portion 286 that extends generally vertically as viewed in FIG. 5.

The inner edge 290 includes a first portion 292 that extends generally downward and to the right from an intersection point 298 with the first edge portion 250. A second curved portion 294 extends from the first curved portion 292 upward and to the right. A third curved portion 296 extends from the second curved portion 294 upward and to the right along a curvature opposite or reversed from the first and second curved portions 292 and 294. The third curved portion 296 terminates in an intersection with the second portion 286 of the outer edge 280 at a terminal end point 288.

To construct the air bag 14, the center panel 210 is looped and the first and second end portions 260 and 280 are interconnected by the central stitching 220. According to the present invention, the inner edge 270 of the first end portion 260 and the inner edge 290 of the second end portion 280 are configured to mate with each other and, when interconnected, place the center panel 210 in the form of a loop and form the recess 200. To accomplish this, the edges of the first and second end portions 260 and 280 are interconnected as follows:

1.) The first portion 272 of the inner edge portion 270 of the first end portion 260 is connected to the third portion 296 of the inner edge portion 290 of the second end portion 280.

2.) The second portion 274 of the inner edge portion 270 of the first end portion 260 is connected to the second portion 294 of the inner edge portion 290 of the second end portion 280.

3.) The third portion 276 of the inner edge portion 270 of the first end portion 260 is connected to the first portion 292 of the inner edge portion 290 of the second end portion 280.

As can be seen from the above, this places the terminal end point 268 of the first end portion 260 at the intersection point 298 of the second end portion 280. The outer edge 262 and the upper edge 250 thus form an endless loop when the inner edges 270 and 290 are interconnected by the central stitching 220. Similarly, this places the terminal end point 288 of the second end portion 280 at the intersection point 278 of the first end portion 260. The outer edge 282 and the lower edge 252 thus form an endless loop when the inner edges 270 and 290 are interconnected by the central stitching 220.

To continue construction of the air bag 14, the first side panel 212 is connected to the center panel 210 via the first side stitching 222 along the looped edge formed by the outer edge 262 and upper edge 250. The second side panel 214 is connected to the center panel 210 via the second side stitching 224 along the looped edge formed by the outer edge 282 and lower edge 252. If the air bag 14 includes vents 100, the vent door panels 230 and 232, and the tethers 234 and 236, may be connected to the side panels 212 and 214 prior to connecting the side panels to the center panel 210.

Figure 7:
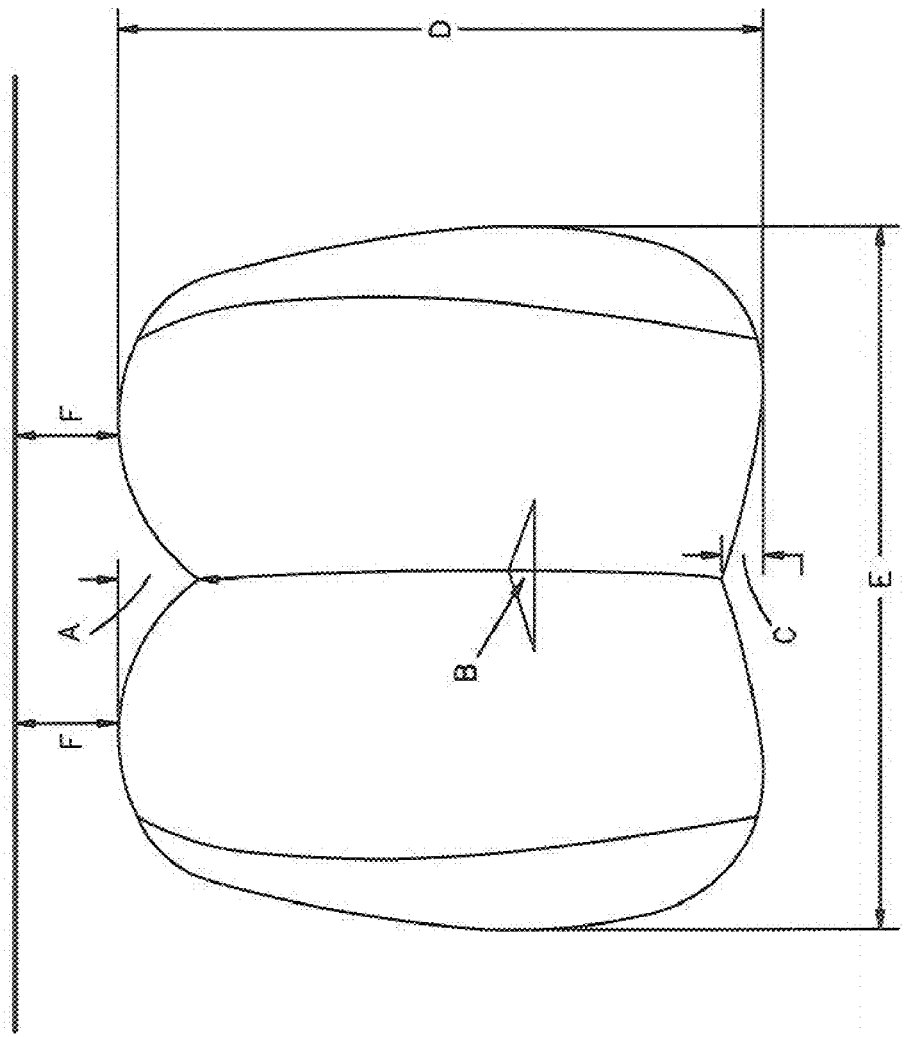
FIG. 7 is a front view of an embodiment of a bi-lobular air bag in accordance with the present invention in an inflated condition and illustrating certain dimensions.
Figure 11A:
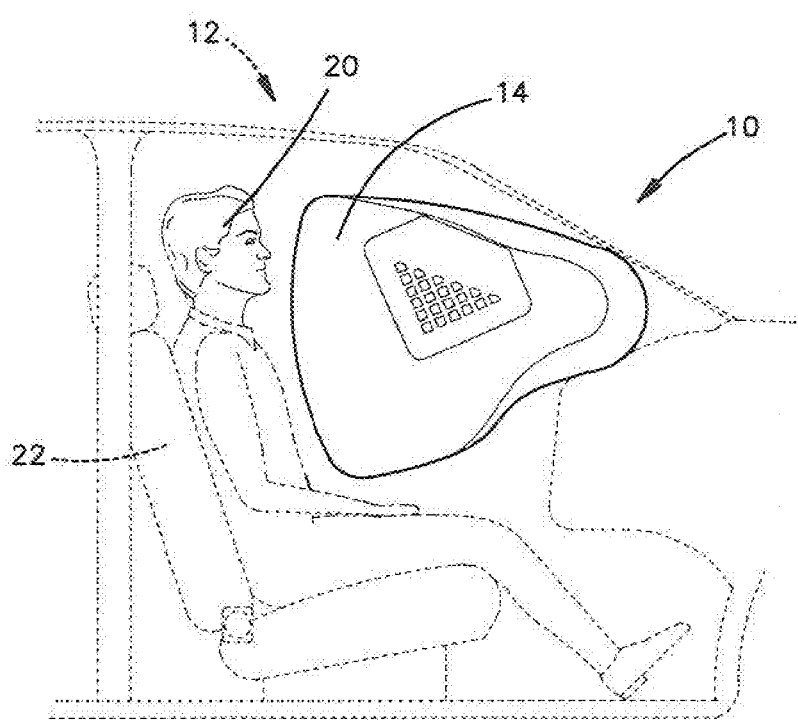
Figure 11B:
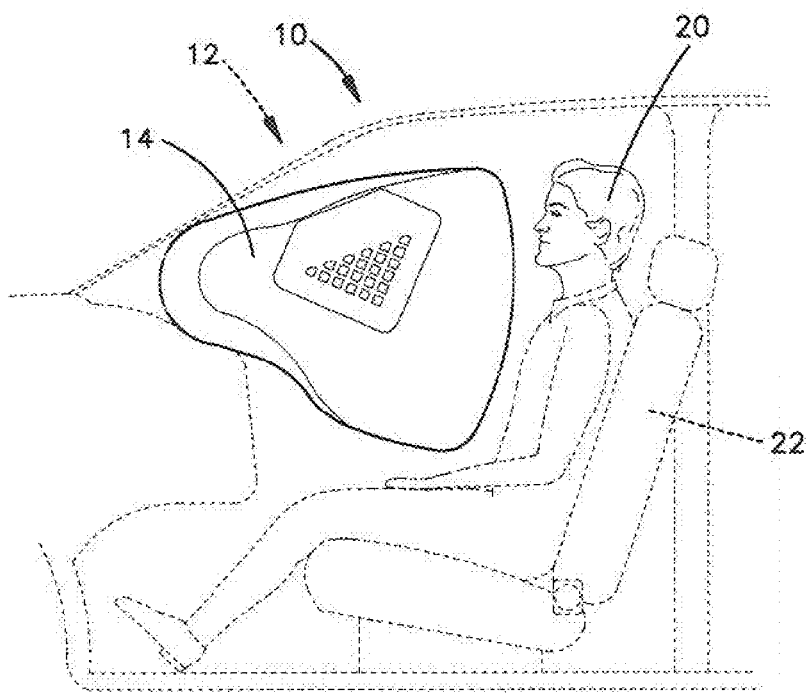

The air bag 14, constructed in this manner, includes the central recess 200, first lobe 202, and second lobe 204. Those skilled in the art will appreciate that, according to the present invention, the configuration of the central recess 200 and, thus, the lobes 202 and 204, depends on the relation between the inner radius $R_{in}$ of the second portions 274 and 294 of the inside edges 270 and 290 and the outer radius $R_{out}$ of the first portions 264 and 284 of the outside edges 262 and 282. By changing the difference between $R_{in}$ and $R_{out}$, the arc angle of the center panel and the depth of the central recess 200 can be controlled to desired dimensions. The larger the difference the deeper the recess 200. This is illustrated in various example embodiments shown in FIGS. 7-10B:

Embodiment of FIG. 7
Volume: 108 liters
Width (E): 545 mm
Height (D): 480 mm
Depth @ top (A): 55 mm
Depth @ center (B): 20 mm
Depth @ bottom (C): 25 mm
Embodiment of FIGS. 8A & 8B
Width (E): 540 mm Height (D): 570 mm
Depth @ top (A): 70 mm
Depth @ center (B): 50 mm
Depth @ bottom (C): 150 mm
Embodiment of FIGS. 9A & 9B
$R_{in}$: 300
$R_{out}$: 540
Arc Angle: 162 degrees
Volume: 110 liters
Width (E): 550 mm
Height (D): 545 mm
Depth @ top (A): 130 mm
Depth @ center (B): 40 mm
Depth @ bottom (C): 65 mm
Embodiment of FIGS. 10A & 10B
$R_{in}$: 272
$R_{out}$: 512
Arc Angle: 154 degrees
Volume: 110 liters
Width (E): 540 mm
Height (D): 550 mm
Depth @ top (A): 110 mm
Depth @ center (B): 40 mm
Depth @ bottom (C): 60 mm Deployment of the air bag 14 is illustrated in FIGS. 11A-11C. As shown in FIGS. 11A-11C, the central recess 200 of the bi-lobular air bag 14 provides relief for the head. This shape bag can also help support the occupant's head for angular impacts. The recess 200 provides an area in the bag where the occupant's head fits to minimize bag interaction. This shape causes the bag to load more on the shoulders than the head. The location of the indentation can be moved or extended to the bottom of the bag to also provide a "pocket" for an infant's head in a rear facing infant seat.

Figure 12:
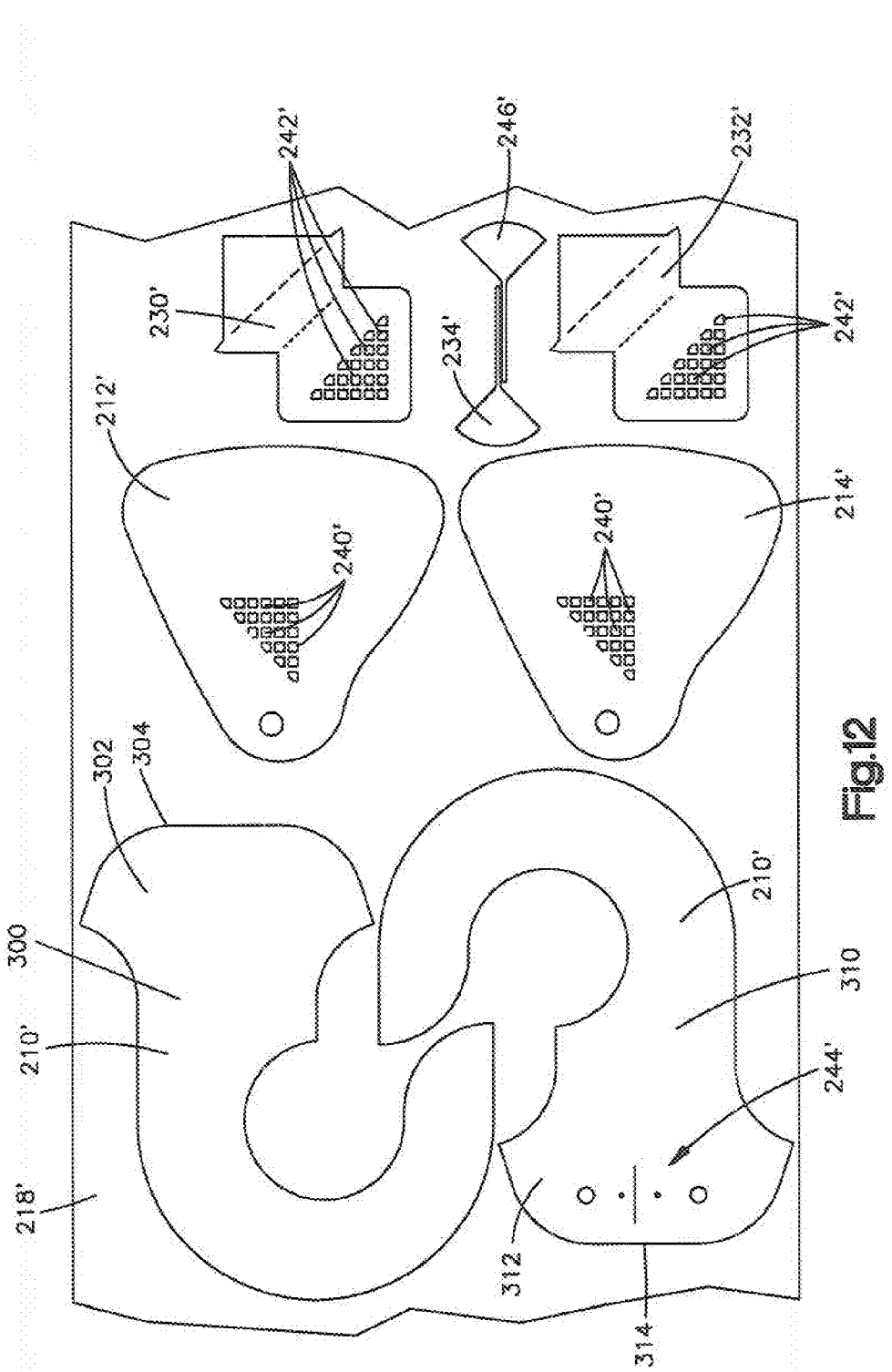
FIG. 12 is a plan view illustrating portions of a bi-lobular air bag laid out on a sheet for cutting into individual parts in accordance with another embodiment of the present invention.

FIG. 12 illustrates an alternative construction of the air bag. As shown in FIG. 12, the center panel 210' may have a two piece construction. FIG. 12 illustrates how components used to construct the air bag may be cut from a single piece or sheet 218' of material. As shown in FIG. 12, the two piece design of the center 210' panel may help provide better nesting and thereby help reduce material costs.

As shown in FIG. 12, the components may include the center panel 210', side panels 212' and 214', first and second vent door panels 230' and 232', respectively, and first and second vent tethers 234' and 236', respectively. The side panels 212' and 214' include vent openings 240' that correspond with openings 242' in the vent door panels 230' and 232'. The center panel 210' may have various openings 244' for accommodating connection with the air bag module and the inflator.

As shown in FIG. 12, the two piece design includes center panel component piece 300 and 302. The center panel components 300 has an end portion 302 with a terminal edge 304. The center panel component 310 has an end portion 312 with a terminal edge 314. The end portions 302 and 312 have an outwardly flared configuration and the terminal edges 304 and 314 have curved configurations.

Referring to FIG. 13, stitching 320 interconnects the end portions 302 and 312 along the terminal edges 304 and 314. According to the present invention and, as illustrated in FIG. 13, the outwardly flared configuration of the end portions 302 and 312 in combination with the curved configuration of the terminal edges 304 and 314 help tailor the overall configuration of the air bag 14'. As shown in FIG. 13, the curved configuration of the terminal edges 304 and 314 provides a rearward region 322 of the air bag 14' with a narrowly tapered shape that may, for example, help position that portion of the air bag in the space between the windshield and instrument panel of the vehicle. Also, the outwardly flared configuration of the end portions 302 and 312 helps provide a large radius (illustrated generally at R in FIG. 13) connection between the center panel 210' and the side panel 212'. This can help make it easier to stitch the side panel 212' to the center panel 210' and this facilitates assembly of the air bag 14'.

From the above description of the invention, those skilled in the art will perceive improvements, changes and modifications. Such improvements, changes and modifications within the skill of the art are intended to be covered by the appended claims.

Having described the invention, the following is claimed:

1. An inflatable vehicle occupant protection device for being inflated between an occupant of the vehicle and an instrument panel of the vehicle, the protection device comprising:
   a vertically extending central recess and first and second lobes positioned on opposite sides of the central recess, the central recess and the first and second lobes being defined at least partially by an elongated center panel of the protection device, the center panel comprising:
   first and second longitudinal edges spaced apart from each other and extending along the length of opposite edge portions of the center panel; and
   first and second end portions spaced apart and positioned opposite each other along the length of the center panel;
   the center panel being arranged in a loop, a portion of the first longitudinal edge along the first end portion being interconnected with a portion of the second longitudinal edge along the second end portion of the panel to form a vertically extending seam that helps define the central recess.

2. The inflatable vehicle occupant protection device recited in claim 1, wherein the first and second end portions have curved configurations extending away from each other in opposite directions.

3. The inflatable vehicle occupant protection device recited in claim 2, wherein the width and curvature of the first and second end portions define both a depth of the central recess and respective shapes of the first and second lobes.

4. The inflatable vehicle occupant protection device recited in claim 1, wherein the center panel further comprises a central portion positioned between the first and second end portions, portions of the first and second edges extending along the central portion being substantially straight and parallel to each other.

5. The inflatable vehicle occupant protection device recited in claim 1, wherein a portion of the second longitudinal edge along the first end portion helps define a first outer edge of the looped center panel, and a portion of the first longitudinal edge along the second end portion helps define a second outer edge of the looped center panel.

6. The inflatable vehicle occupant protection device recited in claim 5, further comprising:
   a first side panel having a periphery connected to the first outer edge of the looped center panel; and
   a second side panel having a periphery connected to the second outer edge of the looped center panel;
   the center panel, first side panel and second side panel defining an inflatable volume of the protection device.

7. The inflatable vehicle occupant protection device recited in claim 6, wherein the first and second side panels when connected to the center panel help define the profile of the protection device when inflated.

8. The inflatable vehicle occupant protection device recited in claim 6, wherein at least one of the first and second side panels comprise vent openings and a vent door configured to selectively vent inflation fluid from the protection device.

9. The inflatable vehicle occupant protection device recited in claim 1, wherein the center panel comprises first and second component panels interconnected with each other at a central location along the length of the center panel, the first component panel including the first end portion of the center panel and the second component panel including the second end portion of the center panel.

10. An inflatable vehicle occupant protection device including a vertically extending central recess and first and second lobes positioned on opposite sides of the central recess, protection device comprising:
   an elongated center panel having a generally S-shaped configuration with a first curved end portion curved outwardly in a first direction with respect to a length of the center panel, and an opposite second curved end portion curved outwardly in a second direction, opposite the first direction, with respect to a length of the center panel;
   the center panel being arranged in a loop, a first inner curved edge of the first curved end portion being connected with a second inner curved edge of the second curved end portion, the connection between the first and second inner curved edges defining the central recess.

11. The inflatable vehicle occupant protection device recited in claim 10, wherein a first outer curved edge of the first end portion helps define a first outer edge of the looped center panel, and a second outer curved edge of the second end portion helps define a second outer edge of the looped center panel, opposite the first outer edge.

12. The inflatable vehicle occupant protection device recited in claim 11, further comprising a first side panel having a periphery connected with the first outer edge of the looped center panel, and a second side panel having a periphery connected with a second outer edge of the looped center panel.

13. The inflatable vehicle occupant protection device recited in claim 12, wherein the first and second side panels have shapes that determine a profile shape of the protection device when inflated.

14. The inflatable vehicle occupant protection device recited in claim 12, wherein at least one of the first and second side panels comprise vent openings and a vent door configured to selectively vent inflation fluid from the protection device.

15. The inflatable vehicle occupant protection device recited in claim 10, wherein the first and second end portions have a curvature and a width that determines a depth and contour of the lobes of the protection device.

16. The inflatable vehicle occupant protection device recited in claim 10, wherein the center panel comprises first and second component panels interconnected with each other at a central location along the length of the center panel, the first component panel including the first end portion of the center panel and the second component panel including the second end portion of the center panel.

* * * * *